United States Patent [19]
Guyon

[11] Patent Number: 4,531,654
[45] Date of Patent: Jul. 30, 1985

[54] DRINK DISPENSING DEVICE

[76] Inventor: Gerard E. Guyon, P.O. Box 4488, South Edmonton, Alberta, Canada

[21] Appl. No.: 502,756

[22] Filed: Jun. 9, 1983

[30] Foreign Application Priority Data

Jun. 23, 1982 [CA] Canada .................................. 405839

[51] Int. Cl.³ ............................................... B67D 1/00
[52] U.S. Cl. .................................. 222/78; 222/129.1; 222/641; D7/301; 446/475; 446/483
[58] Field of Search .................... 222/78, 129.1, 129.2, 222/129.3, 129.4, 504, 640, 641; D7/301; D21/115, 119; 446/475, 483

[56] References Cited

U.S. PATENT DOCUMENTS 2,960,792 11/1960 Cyrus .................................. 446/475
3,409,176 11/1968 Krause .................................. 222/641

FOREIGN PATENT DOCUMENTS 993838 7/1976 Canada .
0477881 6/1929 Fed. Rep. of Germany ........ 222/78

Primary Examiner—Joseph J. Rolla
Assistant Examiner—Nils E. Pedersen
Attorney, Agent, or Firm—Larson and Taylor

[57] ABSTRACT

A drink dispensing device which simulates the appearance and operation of a drill rig comprising a base structure on which is mounted a model of a drill rig, control circuitry, and a plurality of drink dispensers. Each drink dispenser comprises a solenoid which, when actuated, releases a predetermined amount of liquid into a collection device leading to a receptacle. The control circuitry includes a selection switch for selecting a drink dispenser solenoid. The circuitry energizes a selected solenoid, and an arrangement for causing the drill rig to lower a block and attached kelly bar to a predetermined lower position while rotating the kelly bar when the selected solenoid is energized. Upon reaching the lower position, rotation of the kelly bar is stopped and then the block and attached kelly bar are raised back to the upper position and stopped until a selection switch is again actuated.

9 Claims, 6 Drawing Figures

DRINK DISPENSING DEVICE

BACKGROUND OF THE INVENTION

This invention relates to a drink dispensing device, and in particular a drink dispensing device which simulates the appearance and operation of an oil drilling rig.

Drink dispensing devices are known. For example Canadian Pat. No. 993,838 discloses a drink dispensing device that enables the automatic dispensing of drinks of pre-selected different sizes from a single bottle.

SUMMARY OF THE INVENTION

The present invention, unlike the device of Canadian Pat. No. 993,838, dispenses standard size shots from any selected one of a number of bottles. Moreover, the dispenser according to the invention includes a model drill rig which simulates not only the appearance but also the function of an actual drill rig. Every time the device is actuated to dispense a drink, the rig lowers a block and attached kelly bar (which rotates during lowering) and then raises the block and kelly bar back to the starting position, all automatically. The device is novel and attention-getting.

Thus, in accordance with a broad aspect of the invention, there is provided a drink dispensing device which simulates the appearance and operation of a drill rig comprising a base structure on which is mounted a model of a drill rig, control circuitry, and a plurality of drink dispensers, said drill rig including a rig frame, a block, and a kelly bar suspended from said block via a swivel mechanism, said device including means to raise and lower said block together with said kelly bar and means to rotate said kelly bar, each drink dispenser comprising a solenoid which, when actuated, releases a predetermined amount of liquid into a collection means leading to a receptacle, said control circuitry including a switch means for selecting a drink dispenser solenoid, means for energizing (i) a selected solenoid, (ii) said means to raise and lower said block to thereby move said kelly bar from a predetermined first position, and (iii) said means to rotate said kelly bar, said device having means, responsive to moving of the kelly bar to a predetermined second position, to deenergize said means to rotate said kelly bar and to energize said means to raise and lower said block so as to move said block towards said first position, said device having means, responsive to moving of said kelly bar back to said first position, to deenergize said means to raise and lower said block.

DESCRIPTION OF THE PREFERRED EMBODIMENT

Figure 1:
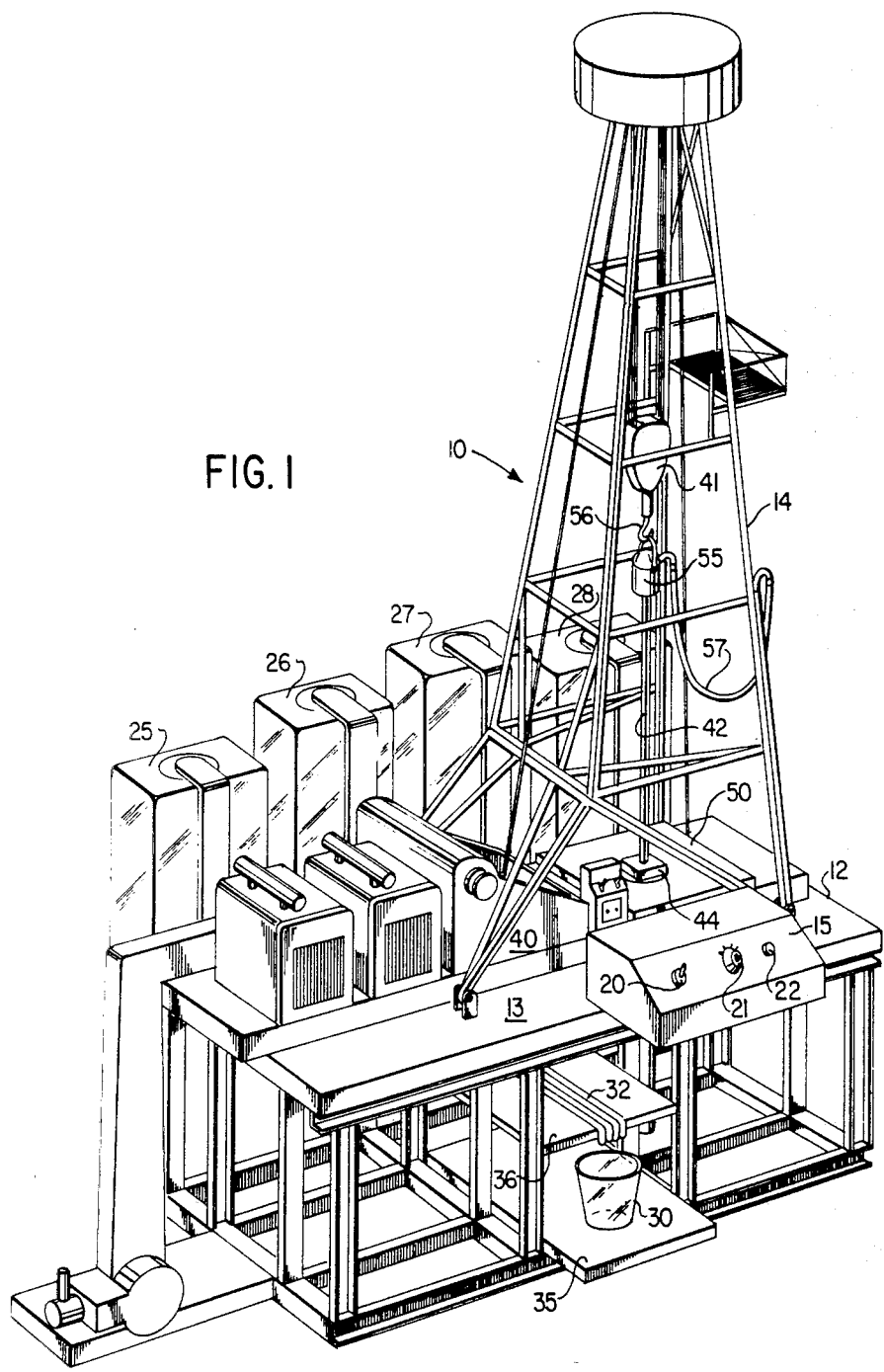
FIG. 1 is a perspective view of the back of a drink dispensing device according to the invention, i.e. as seen from the bartenders position.

Referring to FIG. 1, a drink dispensing device according to the invention is generally indicated at 10 and is seen to include a supporting base structure 12. Mounted on the top portion 13 of the base structure 12 is a working model of a drilling rig 14 and a control box 15. Box 15 contains control circuitry to be described later (FIG. 6) and carries a master switch (on/off) 20, a drink selector switch 21 and a push button switch 22. Through use of these switches, one of a number of different liquids may be selected to be dispensed from containers 25, 26, 27 and 28 for collection in a glass or other receptacle 30, the selected liquid flowing via one of the lines 32.

The support structure 12 includes a support 35 for the glass 30 and a support 36 for the lines 32.

At the same time that a liquid is being dispensed, an electric motor (not shown in FIG. 1) within the housing 40 lowers the rig block 41, then raises it again and stops. A kelly bar 42 is raised and lowered by the block 41 and it passes through a turntable 44 which rotates during lowering of block 41 and kelly bar 42. Turntable 44 is rotated by a second motor which is not visible in FIG. 1 but is mounted beneath structure 50. This will be further described below in connection with FIG. 3.

The kelly bar 42 depends from a swivel mechanism 55 suspended from the hook 56 of the block 41. An electrical connection, to be described later, is made to kelly bar 42 via swivel mechanism 55 from line 57. On a real drill rig, fluid would flow through line 57, swivel mechanism 55 and kelly bar 42.

Figure 2:
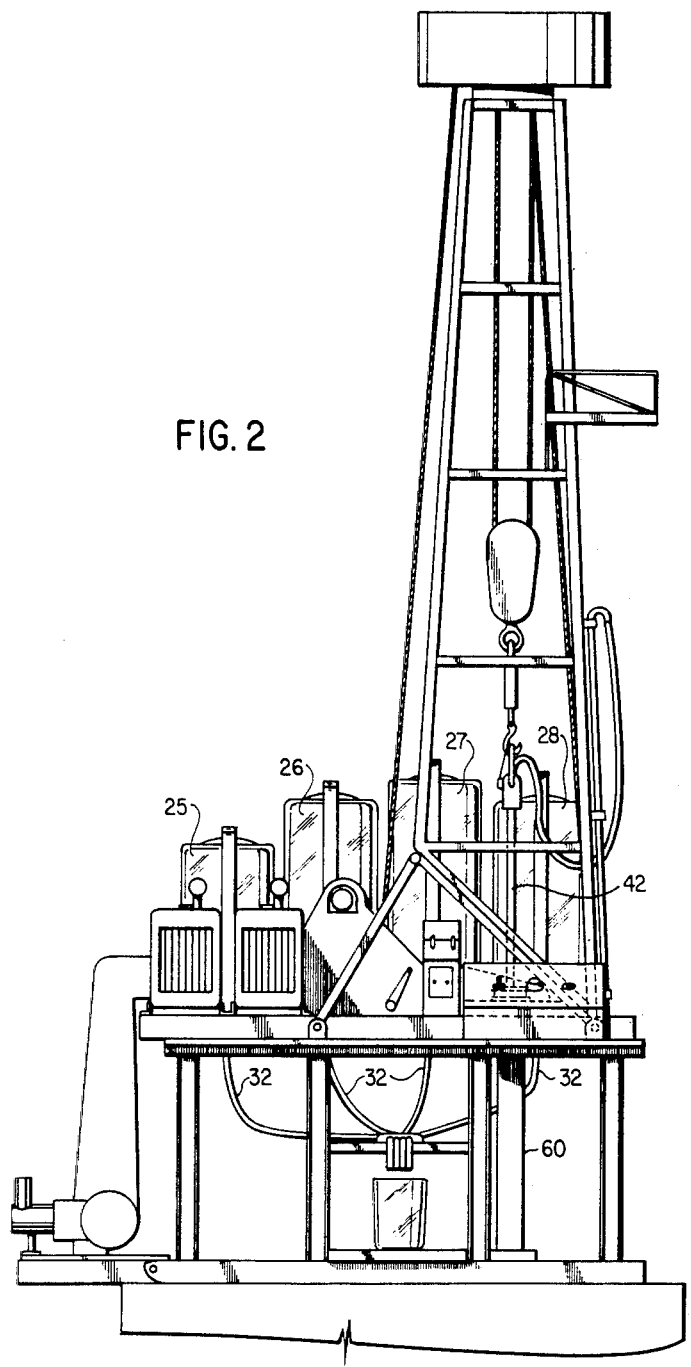
FIG. 2 is a rear elevational view of the device.

FIG. 2 is a view of the rig from the back (as seen by a bartender) and shows the lines 32 leading from the various drink dispensers. It also shows a slide tube 60 into which the kelly bar 42 slides and the purpose of which will be explained in connection with FIGS. 3 and 6.

Figure 3:
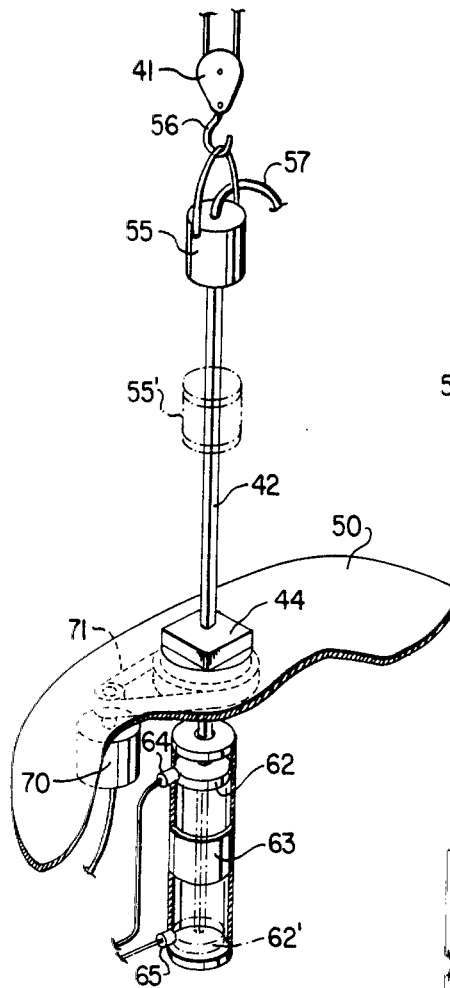
FIG. 3 is a partially cut-away, partially sectional view of certain details of the device.

Turning to FIG. 3, there is shown the kelly bar 42 suspended via swivel mechanism 55 from hook 56 of block 41. The upper position of the swivel mechanism is shown in solid line at 55 and the lower position is shown in dot-dash line at 55'. The lower end of kelly bar 42 carries a conductive disc member 62 which moves between an upper position 62 and a lower position 62' within a slide tube 63 formed of insulating material. When the block is in its raised position, an electrical connection is formed from line 57 to a rotary slide connection in swivel mechanism 55, to kelly bar 42, to disc 62 and finally to contact 64 extending through slide tube 63. When the block is in its lowermost position, a similar connection is made to contact 65 which also extends through slide tube 63. At intermediate block positions, there is no contact to either of contacts 64 and 65. These contacts are used for control functions as will be explained below in connection with FIG. 6.

FIG. 3 also shows a motor 70 below deck 50 which, via belt 71, rotates turntable 44. The kelly bar can slide up and down in the turntable but is rotated thereby.

Figure 5:
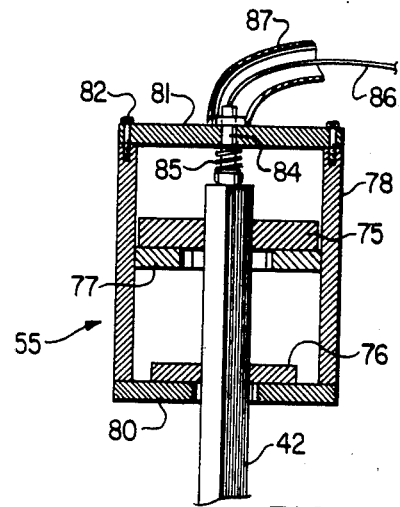
FIG. 5 is a detailed drawing illustrating electrical connection to the kelly bar of the drill rig.

FIG. 5 is a detailed view of a slide mechanism 55 which may be used in the device according to the invention. The kelly bar 42 has disc-like bearing members 75 and 76 secured to it. Bearing member 75 rotatably slides on support ring 77 secured inside cylindrical casing 78 and bearing member 76 rotatably slides on the bottom portion 80 of casing 78. Of course more elaborate bearing means, e.g. ball bearings, could be used if desired. The casing 78 is closed by a cover 81 secured by any suitable fastening means such as bolts 82. A rotatably slidable electrical contact 84 passes through a hole in the center of the cover 81 and is biased downwardly by a spring 85 so that, with the cover in place, the contact 84 slidably engages the top of the kelly bar 42. An electrical lead 86 is connected to the top of the contact 84. The lead 86 is covered by a tubular member 87 of insulating material.

Figure 4:
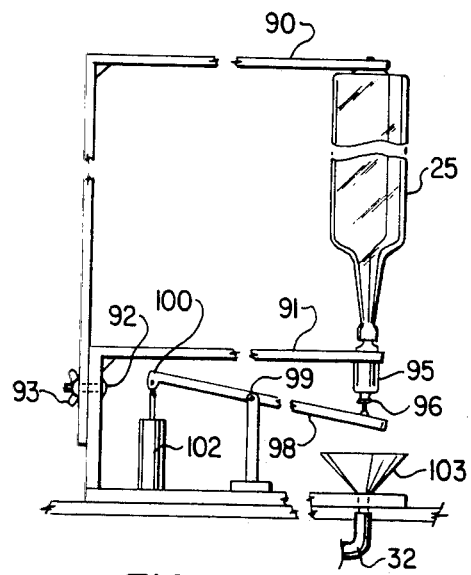
FIG. 4 is a detailed view of a drink dispenser mechanism of the present invention.

FIG. 4 illustrates a drink dispensing device and is seen to comprise upper and lower members 90 and 91 fastened together by a bolt 92 and wing nut 93. A container such as bottle 25 is supported between members 90 and 91, the spacing between which may be adjustable. The mouth of bottle 25 is supported in a leak-proof manner by the upper end of a measuring dispenser 95. The lower end of dispenser 95 is closable by a stopper 96 supported at one end of a lever 98 which is pivotally supported at 99. The end 100 of lever 98 is connected to a solenoid 102. When the solenoid is actuated, the lever 98 is pivoted to remove the stopper 96 from the lower end of dispenser 95 so that a measured amount of liquid can fall into funnel 103 to which is connected a tube 32 (see also FIG. 1). The liquid then flows through tube 32 to a glass 30 (FIG. 1).

Figure 6:
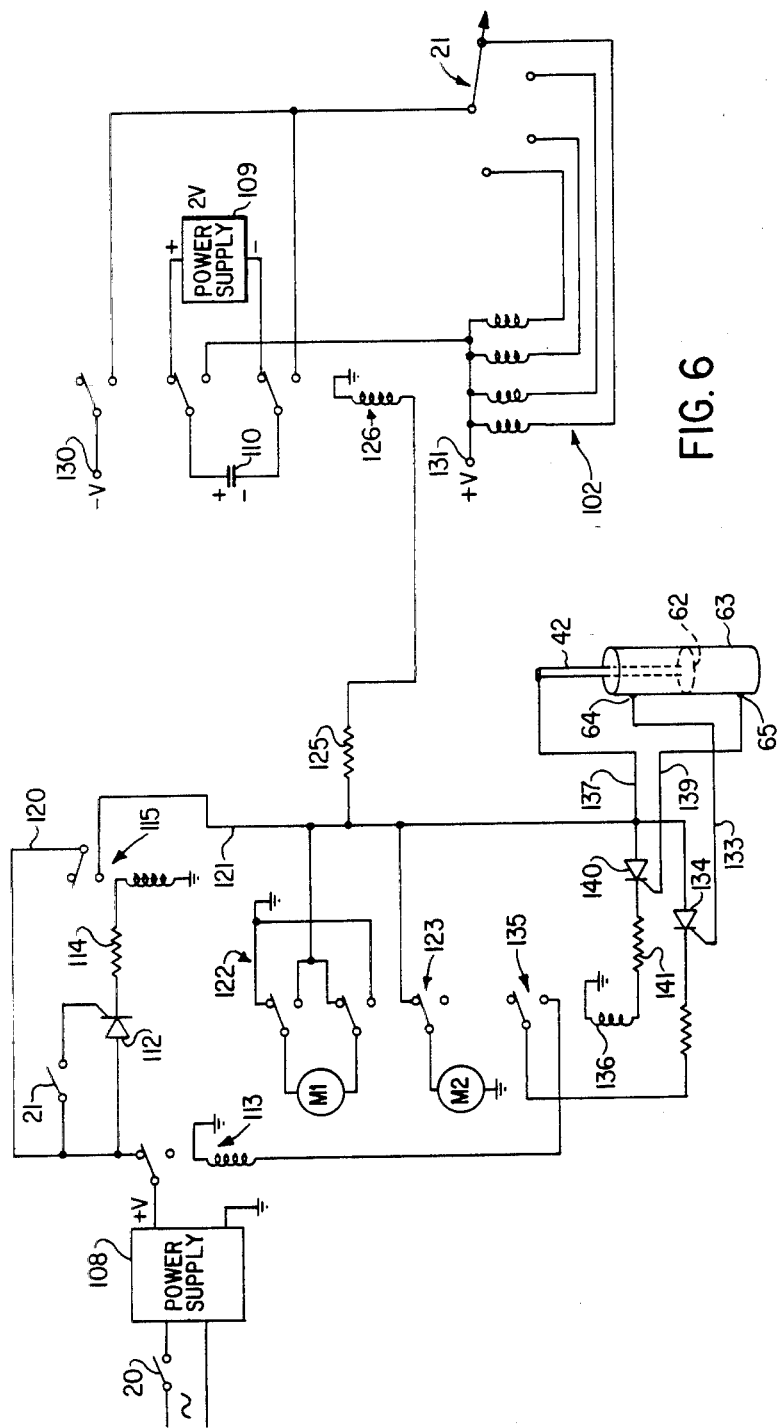
FIG. 6 is an electrical circuit diagram of the control circuitry for the device according to the invention.

FIG. 6 is a simplified wiring diagram for the liquid dispensing device according to the invention. The device is powered by closing switch 20 which supplies, for example, the usual 120 VAC to a power supply, here shown as comprising two parts, 108 and 109. Part 108 supplies +V volts (e.g. 15 volts) to part of the circuit while part 109 charges a capacitor 110 to +2 V volts for fast actuation of a selected solenoid 102. The appropriate solenoid for a particular drink is selected by four position switch 21. Of course switch 21 could have more than four positions in which case more than four drinks could be selected.

With switch 20 closed, +V volts is applied to the anode of SCR 112 via the closed upper contact of relay 113. If switch 21 is now closed, current flows to the gate of SCR 112 to turn it on so that current can flow through SCR 112 and resistor 114 to the coil of relay 115 causing it to switch its contacts and establish a current path over line 120 to line 121. Current will then flow via line 121 and DPDT relay contacts 122 to motor M1 which will then begin rotating in a direction to lower the block 41 and, of course, the kelly bar 42. Furthermore, current will flow via line 121 and SPST relay contacts 123 to motor M2 which will then begin rotating the turntable 44 (FIGS. 1 and 3).

At this same time, current flows from line 121 via resistor 125 to relay 126 which switches its contacts from the upper position, shown in FIG. 6, to the lower position. This results in +2 V volts being applied from capacitor 110 to the selected solenoid 102 to cause it to rapidly actuate and dispense a drink. A parallel voltage of +V is applied to supply holding current via contacts 130 and 131.

Although not so shown in FIG. 6, the sliding contact 62 is initially at its top position and engaging the stationary contact 64 in the tube 63. This means that current is applied over line 133 to the gate of SCR 134; however, SCR 134 is not turned on because its cathode is connected to open contacts 135 of relay 136.

Motors M1 and M2 continue turning until the kelly bar 42 reaches its lowermost position, at which time slide 62 engages contact 65. Current then flows from line 121 via line 137, kelly bar 42, slider 62, contact 65 and line 139 to the gate of SCR 140. SCR 140 turns on and conducts current from line 121 via resistor 141 to relay coil 136 which then switches its contacts from the positions shown in FIG. 6 to the alternate positions. Thus contacts 123 open so that turntable motor M2 stops. Contacts 122 cause the rotation of motor M1 to reverse so that kelly bar 42 is lifted up again. The cathode of SCR 134 is now connected in series with the coil of relay 113 but its gate is not energized so it does not conduct at this time.

Kelly bar 42 continues rising until slider 62 engages contact 64, at which time SCR 134 is triggered on, causing relay 113 to operate and disconnect the power supply 108. This releases relays 115 and 126 and the system is reset, ready for another drink selection.

Some parts of the drilling rig have not been described in detail because they are included merely for authenticity and do not comprise functional parts of the drink dispensing device. For example, at the lower left of FIGS. 1 and 2 there is shown what, on a real drilling rig, would be a circulating mud pump, the purpose of which is to pump fluid through the hose, kelly and bit to flush drilled cuttings out of the hole.

What I claim as my invention is:

1. A drink dispensing device which simulates the appearance and operation of a drill rig comprising a base structure on which is mounted a model of a drill rig, control circuitry, and a plurality of drink dispensers, said drill rig including a rig frame, a block, and a kelly bar suspended from said block via a swivel mechanism, said device including means to raise and lower said block together with said kelly bar and means to rotate said kelly bar, each drink dispenser comprising a solenoid which, when actuated, releases a predetermined amount of liquid into a collection means leading to a receptacle, said control circuitry including a switch means for selecting a drink dispenser solenoid and means for energizing (i) a selected solenoid, (ii) said means to raise and lower said block to thereby move said kelly bar from a predetermined first position, and (iii) said means to rotate said kelly bar, said device having means, responsive to moving of the kelly bar to a predetermined second position, to deenergize said means to rotate said kelly bar and to energize said means to raise and lower said block so as to move said block towards said first position, said device having means, responsive to moving of said kelly bar back to said first position, to deenergize said means to raise and lower said block.

2. A device as claimed in claim 1 wherein said means to raise and lower said block and attached kelly bar comprises a first motor and said means to rotate said kelly bar comprises a second motor, said first motor being reversible.

3. A device as claimed in claim 2 wherein said kelly bar carries a movable contact between an upper stationary contact and a lower stationary contact, said upper stationary contact being connected to the gate of a first SCR and said lower stationary contact being connected to the gate of a second SCR, said means for energizing a selected solenoid comprising a switch which, when closed, energizes a first relay to actuate a second relay which then applies power to the selected solenoid, energization of said first relay also applying power to said first and second motors.

4. A device as claimed in claim 3 in which, when said movable contact engages said lower stationary contact, said first SCR is gated on to energize a third relay to reverse the rotation of said first motor and to stop said second motor.

5. A device as claimed in claim 4 in which, when said movable contact is raised back to the upper position and contacts the upper stationary contact, the second SCR is energized to operate a fourth relay to deenergize and thereby reset the control circuitry.

6. A device as claimed in claim 4, wherein energization of said first relay connects electrical power to said kelly bar via a rotatably slidable connection.

7. A device as claimed in claim 5 wherein said third relay includes contacts which, when said third relay is energized, connect said second SCR in series with a coil of said fourth relay.

8. A device as claimed in claim 5, wherein energization of said first relay connects electrical power to said kelly bar via a rotatably slidable connection.

9. A device as claimed in claim 7, wherein energization of said first relay connects electrical power to said kelly bar via a rotatably slidable connection.

* * * * *